United States Patent
Feng

(10) Patent No.: US 8,493,894 B2
(45) Date of Patent: Jul. 23, 2013

(54) RADIO FREQUENCY FRONT-END CIRCUIT FOR WIRELESS COMMUNICATION DEVICE

(75) Inventor: Jian-Yan Feng, Shenzhen (CN)

(73) Assignees: Shenzhen Futaihong Precision Industry Co., Ltd., Shenzhen (CN); Chi Mei Communication Systems, Inc., New Taipei (TW)

( * ) Notice: Subject to any disclaimer, the term of this patent is extended or adjusted under 35 U.S.C. 154(b) by 273 days.

(21) Appl. No.: 13/011,862

(22) Filed: Jan. 22, 2011

(65) Prior Publication Data

US 2012/0147788 A1    Jun. 14, 2012

(30) Foreign Application Priority Data

Dec. 14, 2010  (CN) .......................... 2010 1 0587319

(51) Int. Cl.
*H04B 7/00*    (2006.01)
(52) U.S. Cl.
USPC .......................................... 370/277; 370/463
(58) Field of Classification Search
USPC .......................................... 370/277, 419, 463
See application file for complete search history.

(56) References Cited

U.S. PATENT DOCUMENTS

| | | | |
|---|---|---|---|
| 2006/0192631 A1* | 8/2006 | Kearns | 333/126 |
| 2007/0211669 A1* | 9/2007 | Umatt et al. | 370/335 |
| 2007/0213015 A1* | 9/2007 | Nagano et al. | 455/83 |
| 2009/0063193 A1* | 3/2009 | Barton et al. | 705/3 |
| 2009/0180403 A1* | 7/2009 | Tudosoiu | 370/278 |
| 2009/0298433 A1* | 12/2009 | Sorrells et al. | 455/62 |

* cited by examiner

*Primary Examiner* — Brian D Nguyen
(74) *Attorney, Agent, or Firm* — Altis Law Group, Inc.

(57) ABSTRACT

A radio frequency (RF) front-end circuit includes a multiband antenna, an antenna switch, a duplexer, a communication mode selection switch, and a processor. The processor selectively connects the antenna switch or the duplexer to the multiband antenna using the communication mode selection switch. When the multiband antenna is connected to the antenna switch, the processor directs the antenna switch to transmit wireless signals used in a first wireless communication system received by or sent from the multiband antenna; when the multiband antenna is connected to the duplexer, the duplexer transmits wireless signals used in a second wireless communication system received by or sent from the multiband antenna.

9 Claims, 1 Drawing Sheet

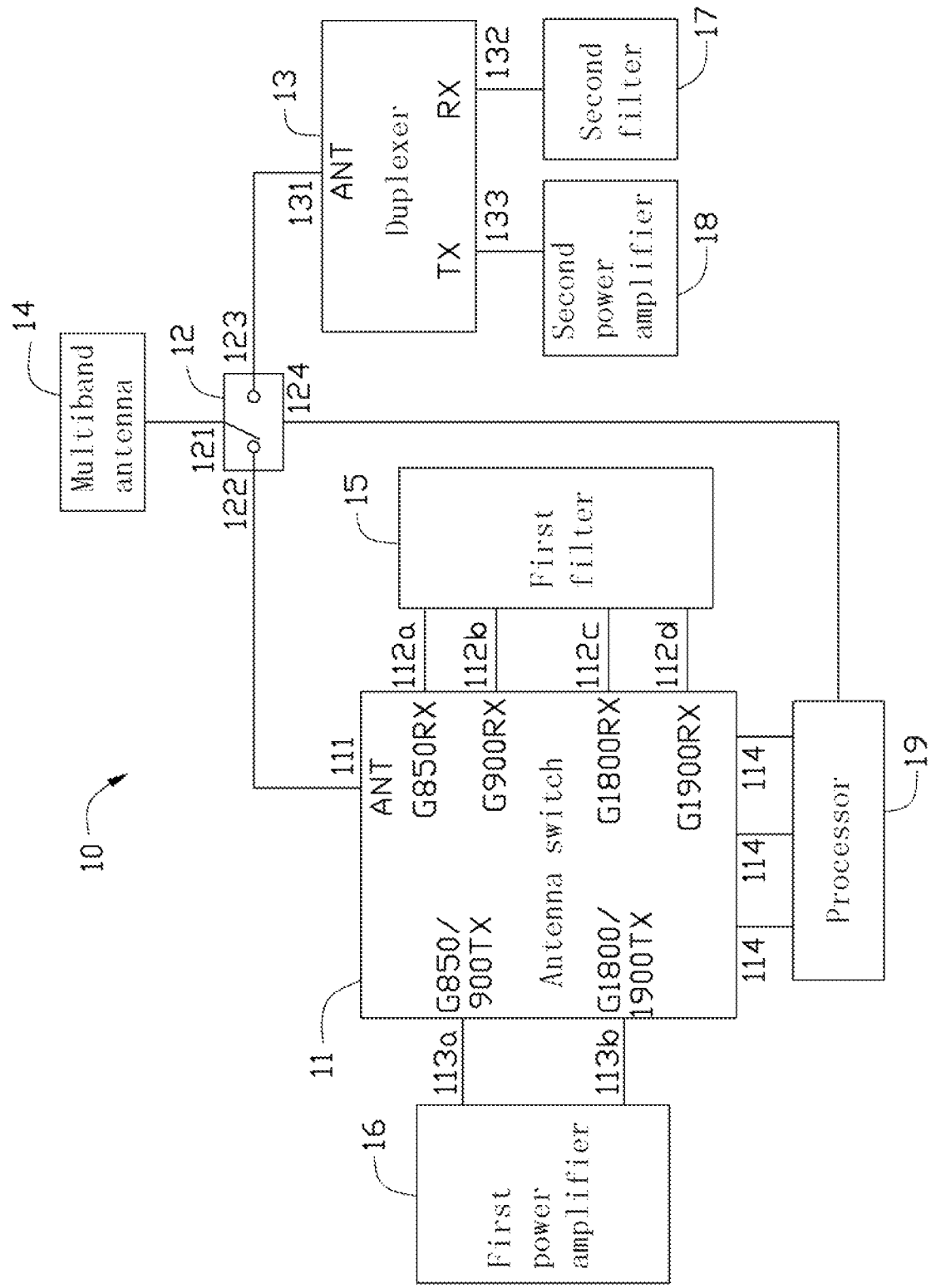

RADIO FREQUENCY FRONT-END CIRCUIT FOR WIRELESS COMMUNICATION DEVICE

BACKGROUND

1. Technical Field

The present disclosure relates to wireless communication, and particularly to a radio frequency (RF) front-end circuit for multiband wireless communication devices.

2. Description of Related Art

Many wireless communication devices, such as mobile phones, personal digital assistants (PDA), and notebook computers, utilize multiband wireless communication. In use, such devices receive and transmit wireless signals in different frequency bands, such as Global System for Communications (GSM) and Universal Mobile Telecommunications System (UMTS).

Most multiband wireless communication devices are enabled to receive and transmit wireless signals in different frequency bands using their RF front-end circuits. An RF front-end circuit of a multiband wireless communication device generally includes a multiband antenna, an antenna switch, and a plurality of signal processing circuits, such as amplifier, filter, duplexer, for example. The multiband antenna can receive and transmit wireless signals in a plurality of frequency bands. The antenna switch is connected to the multiband antenna and includes a plurality of pins for respectively transmitting the wireless signals in the plurality of frequency bands. The signal processing circuits are correspondingly connected to the pins. The antenna switch can selectively connect any of the signal processing circuits to the multiband antenna using the pins.

In use, when the multiband wireless communication device needs to receive or transmit wireless signals in any frequency band selected from the plurality of frequency bands, the antenna switch connects signal processing circuits for wireless signals in the selected frequency band, such as a filter for received wireless signals, and an amplifier for amplifying outgoing wireless signals in the selected frequency band, to the multiband antenna using pins corresponding to these signal processing circuits. Thus, RF channels for transmitting the wireless signals in the selected frequency band are generated in the antenna switch. Through the RF channels, wireless signals in the selected frequency band received by the multiband antenna can be transmitted to a corresponding signal processing circuit to be processed, such as transmitted to the filter to be filtered, and wireless signals in the selected frequency band processed by another corresponding signal processing circuit, such as amplified by the amplifier, can be transmitted to the multiband antenna to be sent.

A main shortcoming of many RF front-end circuits is that the antenna switches may generate additional costs. For example, an antenna switch of a conventional RF front-end circuit generally includes different pins for respectively transmitting wireless signals in different UMTS frequency bands. However, most multiband wireless communication devices use only one of the UMTS frequency bands, whereby the pins for transmitting wireless signals in unused UMTS frequency bands unnecessarily increase costs.

Therefore, there is room for improvement within the art.

BRIEF DESCRIPTION OF THE DRAWINGS

Many aspects of the present RF front-end circuit can be better understood with reference to the following drawings. The components in the various drawings are not necessarily drawn to scale, the emphasis instead being placed upon clearly illustrating the principles of the present disclosure. Moreover, in the drawings, like reference numerals designate corresponding parts throughout the figures.

The FIGURE is a circuit diagram of an RF front-end circuit, according to an exemplary embodiment.

DETAILED DESCRIPTION

The FIGURE shows an RF-front end circuit 10, according to an exemplary embodiment. The RF-front end circuit 10 is used in a wireless communication device (not shown), such as a mobile phone or a PDA. The RF-front end circuit 10 includes an antenna switch 11, a communication mode selection switch 12, a duplexer 13, a multiband antenna 14, a first filter 15, a first power amplifier 16, a second filter 17, a second power amplifier 18, and a processor 19. In this embodiment, the processor 19 can be integrated with a central processing unit (CPU) of the wireless communication device.

The antenna switch 11 is a GSM antenna switch, including an antenna pin 111, four receiving pins 112*a*, 112*b*, 112*c*, 112*d*, two transmitting pins 113*a*, 113*b*, and three control pins 114. The four receiving pins 112*a*, 112*b*, 112*c*, 112*d* are respectively used to receive wireless signals in frequency bands of GSM850, GSM900, GSM1800, and GSM1900 (hereafter called "GSM850/GSM900/GSM1800/GSM1900 signals"). The transmitting pin 113*a* is used to output GSM850 and GSM900 signals, and the transmitting pin 113*b* is used to output GSM1800 and GSM1900 signals. All the receiving pins 112*a*, 112*b*, 112*c*, 112*d* are connected to the first filter 15. The two transmitting pins 113*a*, 113*b* are both connected to the first power amplifier 16.

All the control pins 114 are connected to the processor 19. Through the control pins 114, the processor 19 can control any of the receiving pins 112*a*, 112*b*, 112*c*, 112*d* and the transmitting pins 113*a*, 113*b* to be selectively connected to the antenna pin 111. In this way, the processor 19 can control the antenna switch 11 to selectively generate any of a plurality of RF channels for respectively transmitting GSM850, GSM900, GSM1800, and GSM1900 signals. Particularly, RF channels for receiving GSM850, GSM900, GSM1800, and GSM1900 signals are respectively generated when the receiving pins 112*a*, 112*b*, 112*c*, 112*d* are respectively connected to the antenna pin 111, an RF channel for transmitting GSM850 and GSM 900 signals is generated when the transmitting pin 113*a* is connected to the antenna pin 111, and an RF channel for transmitting GSM1800 and GSM 1900 signals is generated when the transmitting pin 113*b* is connected to the antenna pin 111.

The communication mode selection switch 12 is a single-pole double-throw (SPDT) switch, including a movable connection point 121, two static connection points 122, 123, and a control end 124. The movable connection point 121 and the two static connection points 122, 123 are respectively connected to the multiband antenna 14, the antenna pin 111 of the antenna switch 11, and the duplexer 13. The control end 124 is connected to the processor 19. The processor 19 can selectively connect the movable connection point 121 to either of the two static connection points 122, 123 through the control end 124, thereby selectively connecting the antenna switch 11 or the duplexer 13 to the multiband antenna 14.

The multiband antenna 14 can receive and transmit GSM850, GSM900, GSM1800, GSM1900 signals. The multiband antenna 14 can further receive and transmit wireless signals in a predetermined UMTS frequency band (hereafter "UMTS signals"). The UMTS signals can be in a frequency band of UMTS800, that is a frequency band used in Code Division Multiple Access (CDMA), or in a frequency band of UMTS2100, that is a frequency band used in Wideband Code Division Multiple Access (WCDMA). The duplexer 13 has an antenna pin 131, a receiving pin 132, and a transmitting pin 133. The antenna pin 131 is connected to the static connection point 123 of the communication mode selection switch 12. The second filter 17 is connected to the receiving pin 132. The second power amplifier 18 is connected to the transmitting pin 133. When the duplexer 13 is connected to the multiband antenna 14, UMTS signals received by the multiband antenna 14 can be transmitted to the second filter 17 through the duplexer 13, and UMTS signals amplified by the second power amplifier 18 can be transmitted to the multiband antenna 14 to be sent. The duplexer 13 can prevent received and sent UMTS signals from interfering with each other.

When the multiband wireless communication device using the RF frond-end circuit 10 is used to receive or transmit GSM850/GSM900/GSM1800/GSM1900 signals (in a GSM communication mode), the processor 19 controls the movable connection point 121 to be connected to the static connection point 122, thereby connecting the multiband antenna 14 to the antenna switch 11. The processor 19 controls a selected receiving pin (112a/112b/112c/112d) or transmitting pin (113a/113b) to be connected to the antenna pin 111 to form an RF channel for transmitting to be received/sent GSM signals, and thus the multiband wireless communication device is enabled to receive or transmit any of GSM850/GSM900/GSM1800/GSM1900 signals.

Particularly, when the multiband wireless communication device is used to receive GSM850/GSM900/GSM1800/GSM1900 signals, one of the receiving pins 112a, 112b, 112c, 112d corresponding to the to be received GSM signals is connected to the antenna pin 111 to generate an RF channel for receiving the to be received GSM signals. In this way, GSM850/GSM900/GSM1800/GSM1900 signals received by the multiband antenna 14 are transmitted to the first filter 15 through their corresponding RF channel. The first filter 15 filters received GSM signals to remove noise, and thus the filtered GSM signals can be further processed and used by conventional methods.

When the multiband wireless communication device is used to transmit GSM850/GSM900 signals, the transmitting pin 113a is connected to the antenna pin 111 to generate an RF channel for transmitting both GSM850 and GSM 900 signals. When the multiband wireless communication device is used to transmit GSM1800/GSM1900 signals, the transmitting pin 113b is connected to the antenna pin 111 to generate an RF channel for transmitting both GSM1800 and GSM1900 signals. In both conditions, outgoing GSM signals are first amplified by the first power amplifier 16. Amplified GSM signals are then transmitted to the multiband antenna 14 through their corresponding RF channel, and sent by the multiband antenna 14.

When the multiband wireless communication device using the RF frond-end circuit 10 is used to receive or transmit UMTS signals (in a UMTS communication mode), the processor 19 connects the movable connection point 121 to the static connection point 123, thereby connecting the multiband antenna 14 to the duplexer 13. Thus, UMTS signals received by the multiband antenna 14 are directed to the second filter 17 through the communication mode selection switch 12 and the duplexer 13. The second filter 17 filters received UMTS signals to remove noise, and the filtered UMTS signals can be further processed and used by conventional methods. UMTS signals outgoing from the multiband antenna 14 are first amplified by the second power amplifier 18, and are directed to multiband antenna 14 for transmission through the duplexer 13 and the communication mode selection switch 12. The duplexer 13 can prevent received and sent UMTS signals from interfering with each other.

The present RF front-end circuit 10 can be used to receive and transmit GSM signals in a plurality of frequency bands and UMTS signal in a predetermined frequency band, and is suitable for most multiband wireless communication devices. Compared with other RF front-end circuits, the RF front-end circuit 10 omits unnecessary pins for transmitting UMTS signals in unused frequency bands, which simplifies structure of the antenna switch 11. Correspondingly, structure of the multiband antenna 14 can be simplified, since the multiband antenna 14 needs not be capable of receiving/sending UMTS signals in more than one frequency bands. Thus, cost of multiband wireless communication devices using the present RF front-end circuit 10 can be conserved.

It is to be further understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A radio frequency (RF) front-end circuit, comprising:
a multiband antenna;
an antenna switch including an antenna pin, a plurality of receiving pins, a plurality of transmitting pins, and a plurality of control pins;
a duplexer;
a communication mode selection switch connected to the multiband antenna, the antenna switch, and the duplexer, the communication mode selection switch including a control end; and
a processor connected to the control pins of the antenna switch and the control end of the communication mode selection switch respectively, wherein the processor controls the communication mode selection switch to selectively connect the antenna switch or the duplexer to the multiband antenna through the control end; when the multiband antenna is connected to the antenna switch, the processor controls the antenna switch to transmit wireless signals in a plurality of frequency bands used in a first wireless communication system through the control pins, wireless signals in one of the plurality of frequency bands received by one of the receiving pins, wireless signals in two of the plurality of frequency bands sent from the multiband antenna by one of the transmitting pins; and when the multiband antenna is connected to the duplexer, the duplexer transmits wireless signals used in a second wireless communication system received by or sent from the multiband antenna.

2. The RF front-end circuit as claimed in claim 1, wherein the wireless signals used in the first communication system are GSM signals in a plurality of GSM frequency bands, and the wireless signals used in the second communication system are UMTS signals in a predetermined UMTS frequency band.

3. The RF front-end circuit as claimed in claim 2, wherein the processor controls the antenna switch to transmit GSM signals received by or sent from the multiband antenna in a GSM frequency band selected from the plurality of GSM frequency bands when the multiband antenna is connected to the antenna switch, and the duplexer transmits UMTS signals received by or sent from the multiband antenna in the predetermined UMTS frequency band when the multiband antenna is connected to the duplexer.

4. The RF front-end circuit as claimed in claim 3, wherein the receiving pins for respectively receiving GSM signals in the plurality of GSM frequency bands received by the multiband antenna and the transmitting pins for transmitting to be sent GSM signals in the plurality of GSM frequency bands to the multiband antenna.

5. The RF front-end circuit as claimed in claim 4, further comprising a first filter connected to all the receiving pins for filtering the received GSM signals, and a first power amplifier connected to all the transmitting pins for amplifying the to be sent GSM signals.

6. The RF front-end circuit as claimed in claim 4, wherein the plurality of GSM frequency bands includes GSM850, GSM900, GSM1800, and GSM1900 frequency bands.

7. The RF front-end circuit as claimed in claim 6, wherein the antenna switch includes four receiving pins for respectively receiving GSM850, GSM900, GSM1800, and GSM1900 signals received by the multiband antenna, a transmitting pin for transmitting outgoing GSM850 and GSM900 signals to the multiband antenna, and a transmitting pin for transmitting to be sent GSM1800 and GSM1900 signals to the multiband antenna.

8. The RF front-end circuit as claimed in claim 3, further comprising a second filter connected to the duplexer for filtering the received UMTS signals, and a second power amplifier connected to the duplexer for amplifying the UMTS signals to be sent.

9. The RF front-end circuit as claimed in claim 2, wherein the predetermined UMTS frequency band is a UMTS 800 or UMTS 2100 frequency band.

* * * * *